March 8, 1938.
C. C. FARMER
2,110,703
EMPTY AND LOAD BRAKE DEVICE
Filed Oct. 24, 1936
2 Sheets-Sheet 1
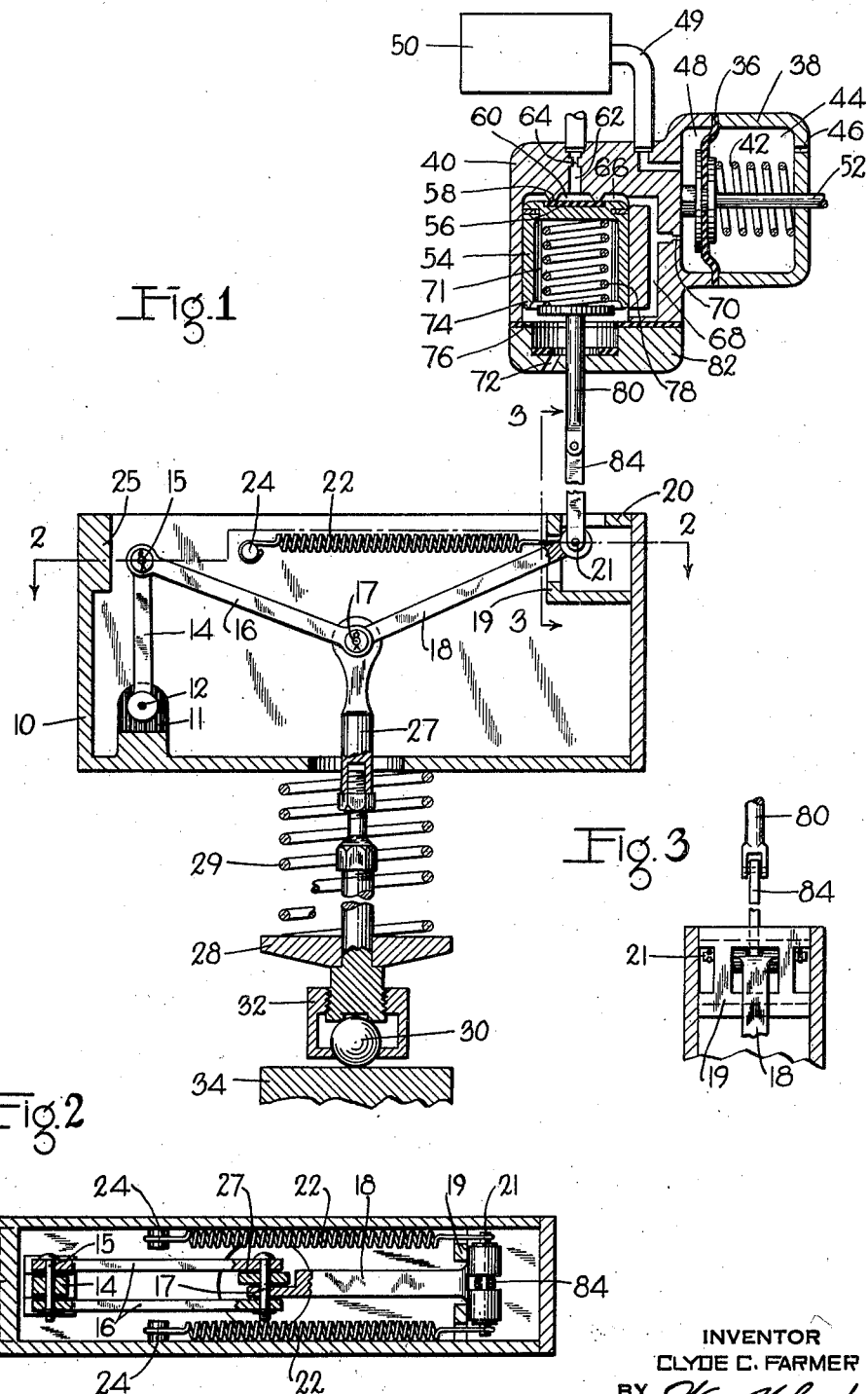
INVENTOR
CLYDE C. FARMER
BY *Wm. N. Cady*
ATTORNEY

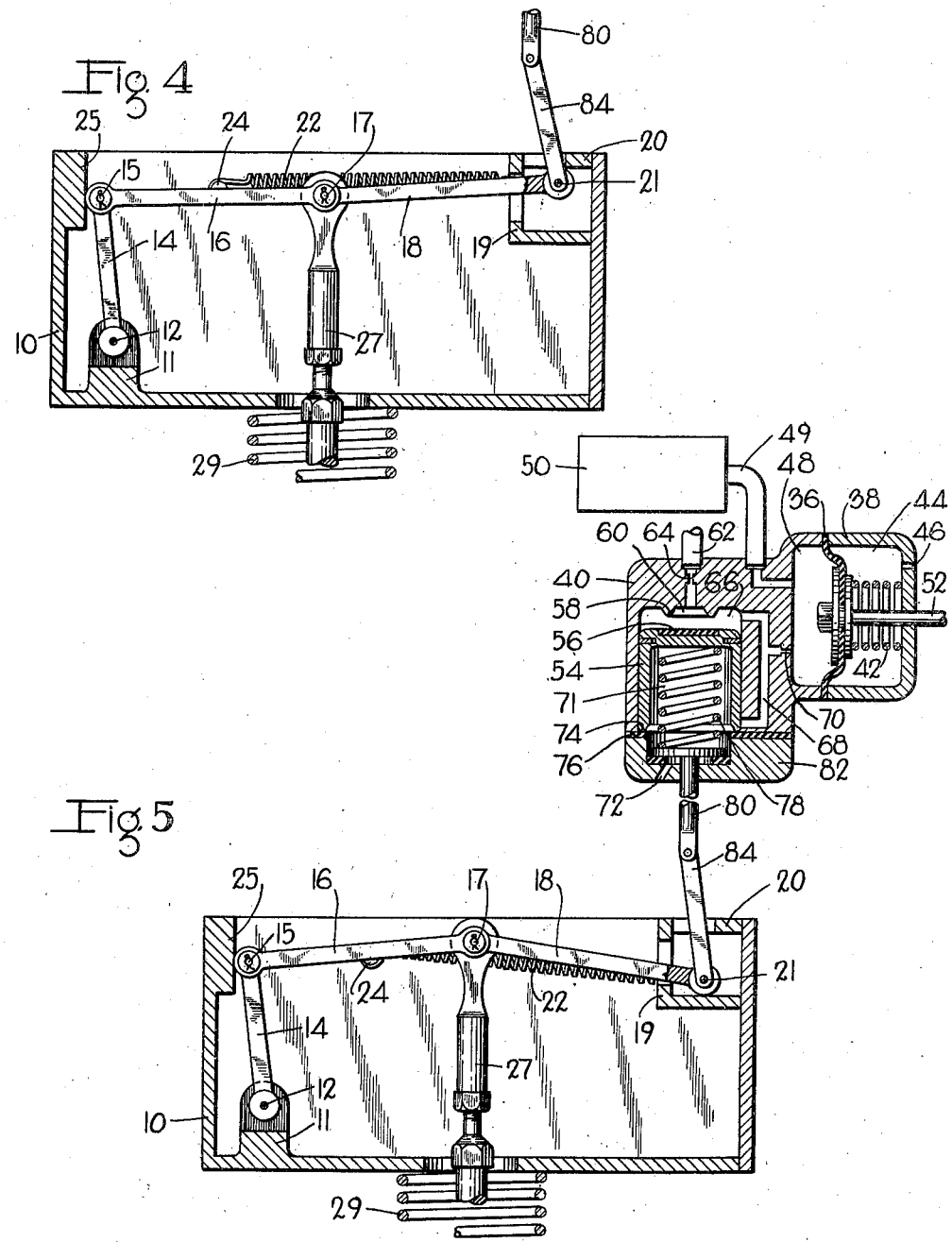

Patented Mar. 8, 1938

2,110,703

UNITED STATES PATENT OFFICE 2,110,703

EMPTY AND LOAD BRAKE DEVICE

Clyde C. Farmer, Pittsburgh, Pa., assignor to The Westinghouse Air Brake Company, Wilmerding, Pa., a corporation of Pennsylvania Application October 24, 1936, Serial No. 107,390

13 Claims. (Cl. 188—195)

This invention relates to an empty and load brake equipment for a vehicle and more particularly to improved means responsive to the load on a vehicle for automatically adjusting the vehicle brake equipment for empty or load operation.

It is an object of this invention to provide improved means of the type described which is positive in operation and of simple and rugged construction.

A further object of the invention is to provide improved means of the type described which will operate to adjust the brake equipment for empty or load operation in response to changes in the load on the vehicle, but which will not produce changes in the adjustment of the brake equipment in response to relative movement of the vehicle body and vehicle truck occasioned by irregularities in the track on which the vehicle is operated.

Another object of the invention is to provide improved change-over means responsive to the load on a vehicle for adjusting the vehicle brake equipment for empty operation or for load operation, this means being arranged so that movements of the vehicle body in amounts less than are effective to cause the change-over means to alter the adjustment of the brake equipment will cause movement of a portion only of the change-over means and thereby minimize wear on this means.

A further object of the invention is to provide improved change-over mechanism incorporating means to delay changes in the adjustment of the brake equipment and thereby prevent unintended changes in the adjustment of the brake equipment.

Another object of the invention is to provide an improved change-over control mechanism for a vehicle empty and load brake equipment.

Other objects of the invention and features of novelty will be apparent from the following description taken in connection with the accompanying drawings, in which Fig. 1 is a fragmentary view, largely in section, of a vehicle brake equipment embodying my invention, the apparatus being shown in the position to condition the brake equipment for empty car operation;

Fig. 2 is a sectional view taken substantially along the line 2—2 of Fig. 1;

Fig. 3 is a sectional view taken substantially along the line 3—3 of Fig. 1;

Fig. 4 is a view of a portion of the equipment shown in Fig. 1, the apparatus being shown in a position intermediate the empty and load positions, and Fig. 5 is a view similar to Fig. 1, but showing the apparatus in the position to condition the brake equipment for load operation.

Referring to the drawings, the apparatus illustrated therein has means responsive to relative movement between the vehicle body, not shown, and an unsprung portion of one of the vehicle trucks for adjusting the change-over means to condition the brake equipment not shown, for either empty or load operation.

This apparatus comprises a frame indicated generally by the reference numeral 10, which is secured to a portion of the vehicle body, not shown, while this frame has a bracket 11 formed thereon to which is pivotally connected by means of a pin 12, one end of a lever 14.

The lever 14 extends upwardly from the bracket 11 and has secured to the upper end thereof by means of a pin 15 one end of a pair of members 16 which form a toggle lever, the other end of which is pivotally connected by means of a pin 17 to a toggle lever 18. The toggle lever 18 extends through an opening in a wall 19 which extends transversely of the toggle lever 18. The end of the lever 18 is forked and has a pin 21 extending through an opening in the end thereof, while tension springs 22 extend between the pin 21 and pins 24 which are secured to the frame 10.

The forked end portion of the toggle lever 18 is somewhat wider than the opening in the wall 19, as is shown in Figs. 2 and 3 of the drawings, so that this portion of the lever will press against the face of the wall 19 and limit movement of this lever to the left, as viewed in the drawings, while the springs 22 exert force on the lever 18 to maintain the forked end thereof in engagement with the wall 19.

When the equipment is in the position in which it is shown in Fig. 1 of the drawings the springs 22 also exert force on the end of the toggle lever 18 to move it upwardly and hold it in engagement with a wall 20 associated with the frame 10.

The frame 10 has, in addition, a projection indicated at 25 formed thereon which is adapted to be engaged by the end of the toggle lever 16 to limit movement of this lever to the left as viewed in the drawings.

A strut 27 is pivotally connected to the pin 17 by which the ends of the toggle levers 16 and 18 are connected, and this strut extends downwardly through an opening in the lower wall of the frame 10 and has secured thereon a spring seat 28, while a coil spring 29 extends between the spring seat 28 and the lower wall of the frame 10 and yieldingly urges the strut 27 downwardly as viewed in the drawings.

The lower end of the strut 27 has a concave socket therein adapted to receive a ball 30, which is maintained in position by a hollow threaded member 32 having an opening therein through which a portion of the ball projects.

The ball 30 is adapted to engage an unsprung portion, indicated at 34, of one of the vehicle trucks at a point adjacent the longitudinal and lateral midportion thereof. As the ball 30 engages the vehicle truck at a point adjacent the mid portion thereof the strut 27 will not be moved as a result of tilting of the vehicle truck or body either laterally or longitudinally.

This apparatus also includes means responsive to the pressure of the fluid in a chamber for conditioning the brake equipment for empty or load braking, together with valve means controlled by the toggle levers 16 and 18 for controlling the supply of fluid under pressure to and the release of fluid under pressure from this chamber.

As shown in the drawings there is a movable abutment in the form of a flexible diaphragm 36, which is clamped between a cover 38 and a body 40 which is secured to the vehicle body by suitable means, not shown.

The diaphragm 36 is subject on one side to the force exerted by a spring 42, which is mounted in a chamber 44 which is constantly connected to the atmosphere by way of a passage 46.

The diaphragm 36 is subject on the other side to the pressure of the fluid in a chamber 48, which is constantly connected by way of a passage and pipe 49 with a timing or volume reservoir 50.

The diaphragm 36 has secured thereto a stem 52 which controls mechanism, not shown, for changing the brake equipment, not shown, over from the condition for empty operation to the condition for load operation, and vice versa.

The body 40 has a bore therein in which is mounted a movable abutment in the form of a piston 54 carrying a sealing gasket 56, which is adapted to engage an annular seat rib 58 formed on the body 40. The chamber 60 within the seat rib 58 is constantly connected by way of a passage and pipe 62 having a choke 64 therein with a suitable source of fluid under pressure, not shown.

The chamber 66 at the face of the valve piston 54 outwardly of the annular seat rib 58 is connected by way of a passage 68 and a choke 70 with the chamber 48 at the face of the diaphragm 36.

The passage 68 also communicates with a chamber 71 at the lower side of the valve piston 54 when the valve piston is in the position in which the sealing gasket 56 engages the annular seat rib 58, and this chamber is connected to the atmosphere by way of a passage 72. The valve piston 54 has an annular seat rib 74 formed thereon which is adapted to engage a sealing gasket 76 to cut off communication between the passage 68 and the chamber 71.

A spring 78 extends between the valve piston 54 and the head of a plunger 80 and yieldingly urges the valve piston 54 upwardly so that the sealing gasket 56 engages the seat rib 58. The plunger 80 has a stem which extends through and is guided by a bore in a cover section 82, while the lower end of the stem of the plunger 80 has pivotally connected thereto a link 84, the other end of which extends through an opening in the wall 20 and is secured on the pin 21 which extends through the end of the toggle lever 18.

When the vehicle is in the empty condition, the spaced relation between the vehicle body and truck is such that with the ball 30 held in engagement with the unsprung portion 34 of the vehicle truck by the spring 29, the toggle levers will be positioned as shown in Fig. 1 with the pin 17, by which the toggle levers 16 and 18 are connected together, held in a position beneath a plane extending through the pins 24, by which the springs 22 are connected to the frame 10, and the pin 21 carried by the end of the lever 18.

In this position of the strut 27 the springs 22 exert force on the pin 21 to cause the lever 18 to tend to pivot about the pin 17 so that the forked end portion of the lever 18 engages the adjacent faces of the walls 19 and 20. The force exerted by the springs 22 on the pin 21 is transmitted through the link 84 to the plunger 80 and thereby causes the spring 78 to be compressed so that the pressure of the spring presses the valve piston 54 against the seat rib 58, while the spring 78 tends to expand and exerts force on the end of the lever 18 tending to move it downwardly. In this position of the toggle lever 18 the force exerted through the spring 78 is great enough to maintain the valve piston 54 in engagement with the seat rib 58 against the opposing force of the fluid under pressure in the chamber 60 within the seat rib 58. The flow of fluid under pressure from the source past the annular seat rib 58 is therefore prevented, and in this position of the valve piston 54 communication is permitted between the passage 68 and the chamber 71 at the spring side of the valve piston with the result that the chamber 48 and the volume reservoir 50 are connected to the atmosphere by way of the choke 70, passage 68, chamber 71 and passage 72.

As the chamber 48 is at atmospheric pressure the spring 42 exerts force through the diaphragm 36 and holds the end of the stem 52 against a portion of the body 40. In this position of the stem 52 the mechanism controlled thereby conditions the brake equipment for empty operation.

If while the vehicle is not loaded it is operated on a track there will be relative movement between the vehicle body and truck as a result of irregularities in the track. This movement will be of limited amount, and on downwardly movement of the vehicle body the frame 10 is moved downwardly relative to the unsprung portion 34 of the vehicle truck, thereby compressing the spring 29 which maintains the ball 30 in engagement with the portion 34 of the vehicle truck.

On this downward movement of the vehicle body the forked end portion of the toggle lever 18 is maintained in engagement with the faces of the walls 19 and 20 by the springs 22 with the result that the toggle lever 18 pivots about the pin 21, thereby causing the upper end of the strut 27 to be moved a short distance to the left from the position in which it is shown in Fig. 1 of the drawings. This movement of the strut 27 by the lever 18 is transmitted through the toggle lever 16 to the upper end of the lever 14, while the lever 16 is pivoted about the pin 17 slightly as a result of downwardly directed force exerted thereon through the lever 14 on downward movement of the frame 10 relative to the strut 27.

As a result of these movements of the toggle levers 18 and 16 the end of the toggle lever 16 will move adjacent the projection 25 on the frame 10.

The amount of relative movement between the vehicle body and truck caused by irregularities in the track is relatively small, and the various parts of the equipment are arranged and proportioned so that the end of the lever 16 is not moved into engagement with the projection 25 by these movements.

It will be seen that the end of the toggle lever 18 having the pin 21 secured therein is maintained substantially stationary at this time by the springs 22, with the result that the valve means controlled by the toggle lever 18 is not affected by relative movement between the vehicle truck and body, and the only parts which are moved are the levers 16, 18 and 14.

This apparatus operates automatically on a predetermined increase in the load on the vehicle to change the brake equipment over from the condition for empty operation to the condition for load operation, and to thereafter maintain the brake equipment in this condition until the load on the vehicle is reduced to an amount less than that which is necessary to cause the brake equipment to be changed over from empty to load braking.

If the load on the vehicle is increased the springs of the vehicle will be compressed, and the body of the vehicle will move downwardly relative to the unsprung portion 34 of the vehicle truck. As a result of this downward movement of the vehicle body the frame 10 will be moved downwardly, thereby moving the lever 14 downwardly and causing the lever 16 to be pivoted about the pin 17, which is held substantially stationary by the strut 27. After a predetermined amount of downward movement of the vehicle body, the end of the lever 16 engages the projection 25, as explained above.

In addition, on this downward movement of the frame 10 the pins 24 are moved downwardly, while the pin 21 is also moved downwardly, relative to the pin 17, thereby causing the toggle lever 18 to be pivoted about the pin 17, and as a result of this movement of the toggle lever 18 the forked end portion of the lever is moved away from the face of the wall 19, while the springs 22 are lengthened somewhat, thereby increasing the tension on these springs.

The various parts of the brake equipment are arranged and proportioned so that if the load on the vehicle is increased to a predetermined amount, the amount of downward movement of the vehicle body relative to the vehicle truck will be sufficient that a plane extending through the pins 21 and 24 will extend beneath the pin 17.

When the vehicle body has been moved downwardly this amount the springs 22 exert force on the pin 21 to move the toggle lever 18 in a clockwise direction about the pin 17 with the result that the pin 21 is moved downwardly, and its movement is transmitted through the link 84 to the plunger 80 to move this plunger into engagement with the cover 82. This movement of the plunger 80 and of the toggle lever 18 is assisted by the spring 78 which expands, thereby reducing the force exerted by this spring on the valve piston 54.

When the plunger 80 is moved downwardly into engagement with the cover 82 the spring 78 is unable to maintain the valve piston 54 in engagement with the seat rib 58, and the valve piston 54 is moved downwardly against the spring 78 by the fluid under pressure in the chamber 60 until the seat rib 74 engages the sealing gasket 76 to cut off communication between the passage 68 and the chamber 71 at the spring side of the valve piston.

On movement of the valve piston 54 away from the seat rib 58 fluid under pressure flows through the choke 64 and thence past the seat rib 58 to the chamber 66, thereby subjecting the entire face of the valve piston 54 to fluid under pressure with the result that the seat rib 74 is firmly maintained in engagement with the sealing gasket 76.

Fluid under pressure supplied to the chamber 66 flows therefrom by way of the passage 68 and at a restricted rate through the choke 70 to the chamber 48, from which it flows by way of the passage and pipe 49 to the timing reservoir 50.

After a time interval the pressure of the fluid in the chamber 48 and in the reservoir 50 will increase to a value sufficient to move the diaphragm 36 to the right, as viewed in the drawings, against the opposing force of the spring 42.

On this movement of the diaphragm 36 the stem 52 is moved to the right and conditions the mechanism controlled thereby to change the brake equipment over from the condition for empty operation to the condition for load operation. The apparatus is now substantially in the position in which it is shown in Fig. 5 of the drawings.

If while the brake equipment is adjusted for load operation the load on the vehicle is reduced below a predetermined value, the vehicle springs will expand and move the vehicle body upwardly relative to the unsprung position 34 of the vehicle truck, thereby moving the pins 21 and 24 to a position in which a plane extending between these pins passes above the pin 17, so that the springs 22 again move the end of the toggle lever 18 upwardly into engagement with the face of the wall 20. On this movement of the toggle lever 18 the valve piston 54 is moved into engagement with the seat rib 58 to cut off the supply of fluid under pressure to the chamber 48, while the annular seat rib 74 on the valve piston 54 is moved away from the sealing gasket 76 to permit fluid under pressure to escape from the timing reservoir 50 and the chamber 48 at a restricted rate through the choke 70 and the passage 68 to the chamber 71 at the spring side of the valve piston 54, from which it flows to the atmosphere by way of the passage 72.

The valve piston 54 will be maintained in this position by the springs 22 as the load on the vehicle has been decreased, and after a time interval the pressure of the fluid in the chamber 48 and in the timing reservoir 50 will have been reduced by flow of fluid therefrom through the choke 70 to a value such that the fluid under pressure in the chamber 48 is unable to maintain the diaphragm 36 against the opposing force of the spring 42. The diaphragm 36 and the stem 52 will thereupon be moved to the left, as viewed in the drawings, until the end of the stem 52 engages the body 40. On this movement of the stem 52 the mechanism controlled thereby will be operated to change the adjustment of the brake equipment from the condition for load operation to the condition for empty operation.

The apparatus is now substantially in the position in which it is shown in Fig. 1 of the drawings, and adjusts the brake equipment for empty operation and will maintain it in this condition until the load on the vehicle is again increased to the predetermined value which is effective to cause the brake equipment to be adjusted to the condition for load operation.

The apparatus provided by this invention also operates in such a manner that it will not alter the adjustment of the brake equipment in response to momentary movements of the vehicle body relative to the unsprung portion of the vehicle truck, such as are occasioned by irregularities in the track over which the vehicle is operated.

If while the vehicle is empty or lightly loaded so that the brake equipment is adjusted for empty operation, the vehicle is run over a track and relative movement between the vehicle body and truck occurs, the toggle lever 18 may be moved from the position in which it is shown in Fig. 1 to the position in which it is shown in Fig. 5, with the result that the valve piston 54 is moved downwardly against the spring 78 so that the seat rib 74 engages the gasket 76. Fluid under pressure may then flow to the passage 68 and through the choke 70 to the chamber 48 and the reservoir 50. The rate of flow of fluid through the choke 70 is such, however, that a substantial time interval must elapse before the pressure of the fluid in the chamber 48 will increase to a value high enough to move the diaphragm 36 against the spring 42 and adjust the brake equipment for load operation.

The vehicle springs will quickly expand and move the vehicle body away from the vehicle truck with the result that the toggle lever 18 is returned to the position in which it is shown in Fig. 1, while the valve piston 54 is moved into engagement with the seat rib 58 to cut off the flow of fluid to the passage 68 and to permit the release of fluid from this passage to the chamber 71 and to the atmosphere. The fluid under pressure built up in the chamber 48 and the reservoir 50 may now escape therefrom through the choke 70, and the spring 42 will maintain the end of the stem 52 against the body 40 to condition the brake equipment for empty operation.

Similarly, if while the load on the vehicle is great enough to cause the apparatus to occupy the position in which it is shown in Fig. 5 of the drawings and adjust the brake equipment for load operation, the vehicle is operated over a track, and relative movement takes place between the vehicle body and truck, the toggle lever 18 may be moved from the position in which it is shown in Fig. 5 to the position in which it is shown in Fig. 1.

On this movement of the lever 18 the valve piston 54 is moved into engagement with the seat rib 58 to cut off the supply of fluid to the chamber 48, while the seat rib 74 is moved away from the gasket 76 to permit the release of fluid from the passage 68. Fluid under pressure may then flow at a restricted rate from the chamber 48 and the reservoir 50 through the choke 70 to the passage 68 and to the atmosphere. The volume of the chambers 48 and the reservoir 50, and the rate of flow of fluid through the choke 70 are proportioned so that a substantial time interval must elapse before the pressure of the fluid in the chamber 48 will have been reduced to a value low enough to permit the spring 42 to move the diaphragm 36 and the stem 52 to change the adjustment of the brake equipment.

Because of the load on the vehicle, the vehicle body will be quickly moved downwardly relative to the vehicle truck and the toggle lever 18 will be returned to the position in which it is shown in Fig. 5. On movement of the lever 18 to this position the valve piston 54 is moved away from the seat rib 58 to permit fluid to again flow to the chamber 48 and the timing reservoir 50, while the seat rib 74 engages the gasket 76 to cut off the release of fluid from the passage 68.

While one embodiment of the improved empty and load brake device provided by my invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In an apparatus for adjusting a vehicle brake equipment for empty or load operation, in combination, change-over means responsive to variations in the pressure of the fluid in a control chamber for conditioning the brake equipment for empty or load braking, valve means subject to the opposing pressures of the fluid in an operating chamber and of a spring for controlling the supply of fluid under pressure to and the release of fluid under pressure from said control chamber, and means responsive to the load on the vehicle for varying the force exerted by said spring on said valve means.

2. In an apparatus for adjusting a vehicle brake equipment for empty or load operation, in combination, change-over means responsive to variations in the pressure of the fluid in a chamber for conditioning the brake equipment for empty or load operation, valve means for supplying fluid under pressure to said chamber at a restricted rate and for releasing fluid from said chamber at a restricted rate, and means responsive to the load on the vehicle for controlling said valve means.

3. In an apparatus for adjusting a vehicle brake equipment for empty or load operation, in combination, change-over means responsive to variations in the pressure of the fluid in a chamber for conditioning the brake equipment for empty or load operation, yielding resistance means, valve means subject to the force exerted by said yielding resistance means for controlling the supply of fluid under pressure to and the release of fluid under pressure from said chamber, and means responsive to the load on the vehicle for varying the force exerted by said yielding resistance means on said valve means.

4. In an apparatus for adjusting a vehicle brake equipment for empty or load operation, in combination, change-over means responsive to variations in the pressure of the fluid in a chamber for conditioning the brake equipment for empty or load operation, valve means controlling the supply of fluid under pressure to and the release of fluid under pressure from said chamber, toggle lever mechanism for actuating said valve means, and means responsive to the load on the vehicle for controlling said toggle lever mechanism.

5. In an apparatus for adjusting a vehicle brake equipment for empty or load operation, in combination, change-over means for conditioning the brake equipment for empty or load braking, a toggle lever mounted for movement about an axis, a spring extending between a point on a support and a point on said toggle lever spaced from said axis and exerting force on said toggle lever in a plane extending through said points, means connected to said lever at a point spaced from said axis for adjusting said change-over means, and means responsive to the load on the vehicle for effecting movement of said toggle lever about said axis to change the point of connection of the spring and the lever from a position on one side of a plane extending through said axis and the point of connection of the spring with the support to a position on the other side of said plane.

6. In an apparatus for adjusting a vehicle brake equipment for empty or load operation, in combination, means responsive to the pressure of the fluid in a chamber for conditioning the brake equipment for empty or for load braking, a toggle lever mounted for movement about an axis, a spring extending between a point on a support and a point on said lever spaced from said axis and exerting force on said lever in a plane extending through said points, valve means operatively connected to said toggle lever at a point spaced from said axis and controlling the supply of fluid under pressure to and the release of fluid under pressure from said chamber, and means responsive to the load on the vehicle for effecting movement of said toggle lever about said axis to change the point of connection of the spring and the lever from a position on one side of a plane extending through said axis and the point of connection of the spring with the support to a position on the other side of said plane.

7. In an apparatus for adjusting a vehicle brake equipment for empty or load operation, in combination, change-over means for conditioning the brake equipment for empty or load braking, a toggle lever mounted for movement about an axis, a spring extending between a point on a support and a point on said toggle lever spaced from said axis and exerting force on said lever in a plane extending through said points, means connected to said lever at a point spaced from said axis for adjusting said change-over means, and means responsive to the load on the vehicle for effecting relative movement between the spring and the lever to cause the plane in which the spring exerts force on the lever to be positioned at one side of said axis at one time and at the other side of said axis at another time.

8. In an apparatus for adjusting a vehicle brake equipment for empty or load operation, in combination, change-over means for conditioning the brake equipment for empty or load braking, a toggle lever mounted for movement about an axis, a spring extending between a point on a support and a point on said toggle lever spaced from said axis and exerting force on said lever in a plane extending through said points, means connected to said lever at a point spaced from said axis for adjusting said change-over means, and means responsive to the load on the vehicle for effecting relative movement between said spring and said lever to cause the spring to exert force on the lever to move it in one direction about said axis at one time and in the other direction at another time.

9. In an empty and load brake equipment, in combination, means operative to condition a vehicle brake equipment for empty or load braking including an operating member movable in one direction for adjusting said means for load braking and in the opposite direction for empty vehicle braking, a spring acting on said member, and a toggle lever mechanism responsive to the load on the vehicle and movable according to whether the vehicle is empty or loaded for conditioning said spring to either urge said member to move in one direction or the other.

10. Apparatus for conditioning a vehicle brake equipment for empty or load braking including a movable control member, a toggle lever mechanism operatively connected to said member, a spring cooperating with said member, and said mechanism with the toggle lever mechanism in one position to urge said member to move in one direction and with said mechanism in another position to urge said member to move in the opposite direction, and means responsive to the load on the vehicle for shifting said mechanism to its different positions according to whether the vehicle is empty or loaded.

11. In an empty and load brake equipment, in combination, means operative to condition the brake equipment for empty or load braking and including a movable control member, a toggle lever having one end thereof pivotally connected to said control member and having its other end pivotally connected to an element, a spring extending between a support and a point on said lever spaced from the point of connection of said lever with said element, means to limit movement of said lever by said spring, and means responsive to the load on the vehicle for moving said element and thereby moving the point of connection between said element and said lever from a point at one side to a point at the other side of a plane extending between the points of connection of the spring and the support and of the spring and said lever.

12. In a vehicle empty and load brake equipment, in combination, means responsive to the pressure of the fluid in a chamber for conditioning the brake equipment for empty or load braking, valve means controlling the supply and release of fluid under pressure to and from said chamber, said valve means comprising a movable abutment engageable with a seat rib, a spring yieldingly urging said abutment against said seat rib, means for supplying fluid under pressure to the area at the face of said abutment at one side of said seat rib, and means for supplying fluid under pressure from the area at the face of said abutment at the other side of said seat rib to said chamber, said abutment being operative on movement away from said seat rib to cut off the release of fluid from said chamber, and means responsive to the weight of the load on the vehicle for varying the force exerted by said spring on said abutment.

13. In a vehicle empty and load brake equipment, in combination, means responsive to the pressure of the fluid in a chamber for conditioning the brake equipment for empty or load braking, valve means controlling the supply and release of fluid under pressure to and from said chamber, said valve means comprising a movable abutment engageable with a seat rib, a spring yieldingly urging said abutment against said seat rib, means for supplying fluid under pressure to the area at the face of said abutment at one side of said seat rib, and means for supplying fluid under pressure from the area at the face of said abutment at the other side of said seat rib to said chamber, said abutment being operative on movement away from said seat rib to cut off the release of fluid from said chamber, and toggle lever mechanism responsive to the weight of the load on the vehicle for varying the force exerted by said spring on said abutment.

CLYDE C. FARMER.